(12) United States Patent
Patterson et al.

(10) Patent No.: US 9,645,986 B2
(45) Date of Patent: May 9, 2017

(54) METHOD, MEDIUM, AND SYSTEM FOR CREATING AN ELECTRONIC BOOK WITH AN UMBRELLA POLICY

(75) Inventors: James Patterson, San Francisco, CA (US); Nathan Moody, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1234 days.

(21) Appl. No.: 13/089,154

(22) Filed: Apr. 18, 2011

(65) Prior Publication Data

US 2012/0221436 A1      Aug. 30, 2012

Related U.S. Application Data

(60) Provisional application No. 61/446,239, filed on Feb. 24, 2011.

(51) Int. Cl.
| | |
|---|---|
| G06Q 30/00 | (2012.01) |
| G06F 17/24 | (2006.01) |
| G06Q 30/06 | (2012.01) |
| G06F 3/0482 | (2013.01) |
| G06F 3/0483 | (2013.01) |
| G06F 3/0488 | (2013.01) |
| G06F 17/22 | (2006.01) |
| G06F 3/0484 | (2013.01) |
| G06T 3/60 | (2006.01) |

(52) U.S. Cl.
CPC .......... *G06F 17/241* (2013.01); *G06F 3/0482* (2013.01); *G06F 3/0483* (2013.01); *G06F 3/04842* (2013.01); *G06F 3/04883* (2013.01); *G06F 17/2235* (2013.01); *G06Q 30/0621* (2013.01); *G06T 3/60* (2013.01)

(58) Field of Classification Search
CPC .................................................. G06Q 30/0621
USPC .................................... 705/26.1, 27.1, 26.41
See application file for complete search history.

(56) References Cited

U.S. PATENT DOCUMENTS

| | | | |
|---|---|---|---|
| 5,392,387 A | | 2/1995 | Fitzpatrick et al. |
| 5,463,725 A | | 10/1995 | Henckel et al. |
| 5,799,157 A | * | 8/1998 | Escallon ........... G06F 17/30017 705/26.8 |
| 5,877,765 A | | 3/1999 | Dickman et al. |
| 5,893,132 A | | 4/1999 | Huffman et al. |
| 6,122,647 A | | 9/2000 | Horowitz et al. |

(Continued)

FOREIGN PATENT DOCUMENTS

| | | |
|---|---|---|
| EP | 1205898 A2 | 5/2002 |
| JP | 2005-189906 A | 7/2005 |

(Continued)

OTHER PUBLICATIONS

Jan. 2, 2006—http://ask.metafilter.com/30017/Does-anyone-have-experience-creating-a-copy-protected-eBook.*

(Continued)

*Primary Examiner* — Matthew Zimmerman
(74) *Attorney, Agent, or Firm* — Fenwick & West LLP (57) ABSTRACT

An electronic textbook system allows instructors to create custom coursebooks by integrating various materials from disparate sources. Instructors can arrange the materials, format them, provide tables of contents and indices. Payment mechanisms as well as policies for the components are integrated automatically so that the final book satisfies policy requirements for each of its component parts.

36 Claims, 4 Drawing Sheets

(56) References Cited

U.S. PATENT DOCUMENTS

| | | |
|---|---|---|
| 6,178,431 B1 | 1/2001 | Douglas |
| 6,181,344 B1 | 1/2001 | Tarpenning et al. |
| 6,340,967 B1 | 1/2002 | Maxted |
| 6,438,564 B1 | 8/2002 | Morton et al. |
| 6,590,568 B1 | 7/2003 | Astala et al. |
| 6,704,733 B2 | 3/2004 | Clark et al. |
| 6,957,233 B1 | 10/2005 | Beezer et al. |
| 6,980,652 B1 | 12/2005 | Braitberg et al. |
| 7,007,034 B1* | 2/2006 | Hartman, Jr. ..... G06F 17/30038 707/812 |
| 7,058,902 B2 | 6/2006 | Iwema et al. |
| 7,210,107 B2 | 4/2007 | Wecker et al. |
| 7,340,481 B1* | 3/2008 | Baer ................ G06F 17/24 |
| 7,496,856 B2 | 2/2009 | Beezer et al. |
| 7,546,524 B1 | 6/2009 | Bryar et al. |
| 7,779,347 B2 | 8/2010 | Christiansen et al. |
| 7,873,588 B2 | 1/2011 | Sareday et al. |
| 8,131,647 B2 | 3/2012 | Siegel et al. |
| 8,239,574 B2 | 8/2012 | Keum et al. |
| 8,245,156 B2 | 8/2012 | Mouilleseaux et al. |
| 2002/0037107 A1 | 3/2002 | Trachtman |
| 2002/0082939 A1 | 6/2002 | Clark et al. |
| 2002/0087560 A1 | 7/2002 | Bardwell |
| 2002/0091793 A1 | 7/2002 | Sagie |
| 2002/0120635 A1 | 8/2002 | Joao |
| 2002/0184189 A1 | 12/2002 | Hay et al. |
| 2003/0144961 A1* | 7/2003 | Tharaken ............... G06Q 30/02 705/57 |
| 2003/0218070 A1 | 11/2003 | Tsikos et al. |
| 2004/0024688 A1* | 2/2004 | Bi ........................ G06F 21/10 705/37 |
| 2004/0162846 A1* | 8/2004 | Nakahara ............... G06F 21/10 |
| 2004/0201633 A1 | 10/2004 | Barsness et al. |
| 2004/0205568 A1 | 10/2004 | Breuel et al. |
| 2004/0205645 A1* | 10/2004 | Hoffman .............. G06F 17/243 715/255 |
| 2004/0267527 A1 | 12/2004 | Creamer et al. |
| 2005/0097007 A1* | 5/2005 | Alger .................... G06Q 30/06 705/26.8 |
| 2005/0132281 A1 | 6/2005 | Pan et al. |
| 2005/0193330 A1 | 9/2005 | Peters |
| 2005/0289461 A1* | 12/2005 | Amado ................. G06Q 30/02 715/255 |
| 2006/0053364 A1 | 3/2006 | Hollander et al. |
| 2006/0085767 A1 | 4/2006 | Hinckley et al. |
| 2006/0098899 A1 | 5/2006 | King et al. |
| 2007/0038567 A1* | 2/2007 | Allaire ................ G06Q 30/0239 705/50 |
| 2007/0055926 A1 | 3/2007 | Christiansen |
| 2007/0083906 A1 | 4/2007 | Welingkar |
| 2007/0118794 A1 | 5/2007 | Hollander et al. |
| 2007/0136657 A1 | 6/2007 | Blumenthal |
| 2007/0180392 A1 | 8/2007 | Russo |
| 2007/0300260 A1 | 12/2007 | Holm et al. |
| 2008/0141182 A1 | 6/2008 | Barsness et al. |
| 2008/0168073 A1 | 7/2008 | Siegel |
| 2008/0222552 A1 | 9/2008 | Batarseh et al. |
| 2008/0229182 A1 | 9/2008 | Hendricks et al. |
| 2008/0231610 A1 | 9/2008 | Hotelling et al. |
| 2008/0233980 A1 | 9/2008 | Englund et al. |
| 2008/0243991 A1 | 10/2008 | Ryan et al. |
| 2008/0293450 A1 | 11/2008 | Ryan et al. |
| 2008/0294674 A1 | 11/2008 | Reztlaff et al. |
| 2009/0009532 A1 | 1/2009 | Hallberg |
| 2009/0047647 A1 | 2/2009 | Welch et al. |
| 2009/0049077 A1 | 2/2009 | Lawlor |
| 2009/0125413 A1 | 5/2009 | Le Chevalier et al. |
| 2009/0187842 A1 | 7/2009 | Collins et al. |
| 2009/0241015 A1* | 9/2009 | Bender ............. G06F 17/30038 715/202 |
| 2009/0254802 A1* | 10/2009 | Campagna ............. G06F 17/248 715/209 |
| 2010/0004944 A1* | 1/2010 | Palaniappan .......... G06Q 10/10 705/1.1 |
| 2010/0017701 A1 | 1/2010 | Bargeron et al. |
| 2010/0088746 A1 | 4/2010 | Kota |
| 2010/0114714 A1* | 5/2010 | Vitek ..................... G06Q 30/00 705/14.69 |
| 2010/0114739 A1* | 5/2010 | Johnston ............ G06Q 30/0601 705/26.1 |
| 2010/0161653 A1 | 6/2010 | Krasnow |
| 2010/0210203 A1 | 6/2010 | Kandelar |
| 2010/0185932 A1 | 7/2010 | Coffman et al. |
| 2010/0214216 A1 | 8/2010 | Nasiri et al. |
| 2010/0274864 A1* | 10/2010 | Jalili ............................ 709/206 |
| 2010/0278453 A1 | 11/2010 | King et al. |
| 2010/0315359 A1 | 12/2010 | Seong et al. |
| 2010/0324895 A1 | 12/2010 | Kurzweil et al. |
| 2011/0029435 A1 | 2/2011 | Ronen et al. |
| 2011/0050591 A1 | 3/2011 | Kim et al. |
| 2011/0050594 A1 | 3/2011 | Kim et al. |
| 2011/0055760 A1 | 3/2011 | Drayton et al. |
| 2011/0153047 A1 | 6/2011 | Cameron et al. |
| 2011/0163944 A1 | 7/2011 | Bilbrey et al. |
| 2011/0184960 A1 | 7/2011 | Delpha et al. |
| 2011/0202606 A1 | 8/2011 | Agarwal et al. |
| 2011/0212430 A1* | 9/2011 | Smithmier ............... G09B 5/06 434/322 |
| 2011/0231474 A1 | 9/2011 | Locker et al. |
| 2011/0252415 A1 | 10/2011 | Ricci |
| 2012/0019400 A1 | 1/2012 | Patel et al. |
| 2012/0046947 A1 | 2/2012 | Fleizach |
| 2012/0077175 A1 | 3/2012 | Levisay et al. |
| 2012/0096094 A1 | 4/2012 | So et al. |
| 2012/0102395 A1 | 4/2012 | Cho et al. |
| 2012/0113019 A1 | 5/2012 | Anderson |
| 2012/0151397 A1 | 6/2012 | Oberstein et al. |
| 2012/0166316 A1* | 6/2012 | Messina ............. G06Q 30/0641 705/27.1 |
| 2012/0204092 A1 | 8/2012 | Stoner et al. |
| 2012/0215686 A1* | 8/2012 | Lauzon .................. G06F 17/24 705/39 |
| 2012/0240025 A1 | 9/2012 | Migos et al. |
| 2012/0311438 A1 | 12/2012 | Cranfill et al. |
| 2013/0080968 A1 | 3/2013 | Hanson et al. |

FOREIGN PATENT DOCUMENTS

| | | |
|---|---|---|
| KR | 10-2002-0002102 A | 1/2002 |
| KR | 10-2002-0006129 A | 1/2002 |
| KR | 10-2003-0000244 A | 1/2003 |
| KR | 10-2005-0108231 A | 11/2005 |
| KR | 10-06952090 B1 | 3/2007 |
| KR | 10-2008-0020122 A | 3/2008 |
| KR | 10-2010-0020246 A | 2/2010 |
| KR | 10-2011-0001105 A | 1/2011 |
| KR | 10-2011-0049981 A | 5/2011 |

OTHER PUBLICATIONS

"Babelshot Kitchen," Blog posts on posterous.com, 8 pages, [online] [Retrieved on Mar. 26, 2010] Retrieved from the Internet <URL:http://babelshot.posterous.com/>.

"iPhone's First Picture Translator," pictranslator.com, Fotozio, LLC, 2003, 2 pages, [online] [Retrieved on Mar. 26, 2010] Retrieved from the Internet <URL:http://www.pictranslator.com/index.html>.

Kavallieratou, E., et al., "Skew Angle Estimation in Document Processing Using Cohen's Class Distributions," Pattern Recognition Letters, Nov. 1999, pp. 1305-1311, vol. 20, Issues 11-23.

Mickey, K., et al., "E-Textbooks in Higher Education," Simba Information, 2010, 69 Pages.

PCT International Search Report and Written Opinion, PCT/US2010/051632, Nov. 29, 2010, 8 Pages.

PCT International Search Report and Written Opinion, PCT/US2010/051624, Nov. 30, 2010, 6 Pages.

"Product Overview for WorldCard Mobile iPhone" Penpower Technology Ltd., 3 pages, [online] [Retrieved on Mar. 26, 2010] Retrieved from the Internet <URL:http://worldcard.penpowerinc.com/worldcard-mobile-iPhone.html>.

(56) References Cited

OTHER PUBLICATIONS

"Product Overview for WorldCard Mobile Windows mobile" Penpower Technology Ltd., 1 pages, [online] [Retrieved on Mar. 26, 2010] Retrieved from the Internet <URL:http://worldcard.penpowerinc.com/worldcard-mobile-standard.html>.
Qiang, D., "Portable Translation of Words in Writing: new function to look up words using camera in Youdao dictionary (cell phone version), express delivery of new versions of the dictionary at the same time (referenced)," Blog post from www.163.com, Nov. 1, 2009, 5 pages, [online] [Retrieved on Mar. 26, 2010] Retrieved from the Internet <URL:http://dalong5401.blog.163.com/blog/static/10231322009101103292255/>. With English Summary.
Video from "APPINN.com" demonstrating how a phone application works, 9 pages, [online] [Retrieved on Mar. 26, 2010] Retrieved from the Internet <URL:http://www.appinn.com/youdao-cidian/>.
Video from "Static.youku.com" demonstrating how a phone application works, 1 pages, [online] [Retrieved on Mar. 26, 2010] Retrieved from the Internet <URL:http://static.youku.com/v1.0.0060/v/swf/qplayer.swf?VideoIDS=XMTI2MDUxNDI4&embedid=-&showAd=0>.
PCT International Search Report and Written Opinion, PCT/US2012/025467, Jan. 2, 2013, 7 pages.
Office Action for U.S. Appl. No. 13/280,197, Oct. 15, 2012, 13 Pages.
Office Action for U.S. Appl. No. 13/171,130, Nov. 23, 2012, 21 Pages.
Office Action for U.S. Appl. No. 13/182,797, Nov. 28, 2012, 22 Pages.
Office Action for U.S. Appl. No. 13/182,809, Jan. 25, 2013, 13 Pages.
Office Action for U.S. Appl. No. 13/103,813, Oct. 15, 2012, 20 Pages.
Office Action for U.S. Appl. No. 13/182,733, Jan. 30, 2013, 13 Pages.
Marshall, C., et al., "Turning the Page on Navigation," JDCL'05, Jun. 7-11, 2005, pp. 225-234.
Amazon.com, Inc., Amazon Kindle User's Guide $4^{th}$ Edition, 2004-2011, pp. 1-120, can be retrieved at <URL:http://kindle.s3.amazonaws.com/Kindle_User's_Guide_4th_Edition.pdf>.
BBC, "Subtext," BBC-Learning Development, 1 page, [online] [retrieved on Apr. 23, 2012] Retrieved from the internet <URL:http://www.bbcattic.org/learningdevelopment/projects_subtext.shtml>.
BBC, "Bitesize Book Notes-Give You Brain a Boost," BBC-Book Notes, 2012, 1 page, [online] [retrieved on Apr. 23, 2012] Retrieved from the internet <URL:http://www.bbc.co.uk/schools/gcsebitesize/booknotes/>.
Damm, D., et al., "SyncTS: Automatic synchronization of speech and text documents," AES $42^{nd}$ International Conference, Ilmenau, Germany, Jul. 22-24, 2011, pp. 1-10.
Koolen, C., et al., "Electronic Environments for Reading: An Annotated Bibliography of Pertinent Hardware and Software (2011)," 95 Pages.
Landoni, M., "Evaluating E-books," BooksOnline'10, Oct. 26, 2010, pp. 43-46.
Landoni, M., "The Active Reading Task: E-books and their Readers," BooksOnline'08, Oct. 30, 2008, ACM, pp. 33-36.
Lei, D., "Define, translate and search for words in Google eBooks," Google Books Search, Google Inc., May 19, 2011, 3 pages, [online] [retrieved on Apr. 23, 2012] Retrieved from the internet <URL:http://booksearch.blogspot.com/2011/05/define-translate-and-search-for-words.html>.
Murray, A., "Discover more than 3 million Google eBooks from your choice of booksellers and devices," Google Books Search, Google Inc., Dec. 6, 2010, 2 pages, [online] [retrieved on Apr. 23, 2012] Retrieved from the internet <URL:http://booksearch.blogspot.com/2010/12/discover-more-than-3-million-google.html>.

Neary, L., "Children's Book Apps: A New World of Learning," Npr, Mar. 28, 2011, 3 pages, can be retrieved at <URL:http://www.npr.org/2011/03/28/134663712/childrens-book-apps-a-new-world-of-learning>.
Socialtext, Inc., "Socialtext 5.0 Features," 2012, 2 pages, [online] [retrieved on Apr. 23, 2012] Retrieved from the internet <URL:http://www.socialtext.com/features/>.
Subtext, "Subtext User Guide," 2011, 44 pages, can be retrieved at <URL:http://www.subtext.com/downloads/Subtext-User-Guide.pdf>.
Ribiére, M., et al., "The sBook: towards Social and Personalized Learning Experiences," BooksOnline'10, Oct. 26, 2010, ACM, 6 pages, can be retrieved at <URL:http://research.microsoft.com/en-us/events/booksonline10/ribiere-etal.pdf>.
Robinson, J., et al., "Using Linked Data to Reduce Learning Latency for e-Book Readers," ESWC 2011 Workshops, LNCS 7117, 2012, pp. 28-34.
Vignoli, F., et al., "A Text-Speech Synchronization Technique with Applications to Talking Heads," ISCA Archive, Auditory-Visual Speech Processing, Aug. 7-10, 1999, 5 Pages.
Wilson, R., et al., "The WEB Book experiments in electronic textbook design," Journal of Documentation, 2003, pp. 454-477, vol. 59, No. 4.
Office Action for U.S. Appl. No. 13/171,130, Jan. 5, 2012, 22 Pages.
Office Action for U.S. Appl. No. 13/182,797, Jun. 4, 2012, 23 Pages.
PCT International Search Report and Written Opinion, PCT Application No. PCT/US2012/023628, Aug. 22, 2012, 9 pages.
PCT International Search Report and Written Opinion, PCT Application No. PCT/US2012/023584, Sep. 25, 2012, 9 pages.
PCT International Search Report and Written Opinion, PCT Application No. PCT/US2012/025438, Sep. 19, 2012, 12 pages.
PCT International Search Report and Written Opinion, PCT Application No. PCT/US2012/025443, Sep. 10, 2012, 11 pages.
PCT International Search Report and Written Opinion, PCT Application No. PCT/US2012/023599, Sep. 10, 2012, 9 pages.
United States Office Action, U.S. Appl. No. 13/182,809, Jun. 26, 2012, 12 pages.
United States Office Action, U.S. Appl. No. 13/171,130, Jun. 22, 2012, 20 pages.
ZiiLABS, "Creative Patents Found for "Drag and Drop" on Touch-screen Devices, Revealing Tabbed Web Browsing," Tech in Hiding, Aug. 7, 2009, 6 pages, [online] [retrieved on Jul. 18, 2011] Retrieved from the internet <URL:http://creative.techinhiding.com/2009/08/creative-patents-found-for-drag-and-drop-on-touchscreen-devices-suggesting-multi-tab-web-browsing/>.
Webpage for Whatever.com, 2011, 1 page, [online] [retrieved on Aug. 31, 2011] retrieved from the internet <URL:http://www.whatever.com/>.
Parke, F., "Interactive Tools to Support Animation Tools," Computer Graphics Laboratory, New York Institute of Technology, ACM, 1986, pp. 89-91.
Office Action for U.S. Appl. No. 13/182,797, May 31, 2013, 22 Pages.
Office Action for U.S. Appl. No. 13/182,773, Aug. 20, 2013, 10 Pages.
Fenwick, J., et al., "Teaching Mobile Computing and Developing Software to Support computer Science Education," SIGCSE,'11, ACM Mar. 9-12, 2011, pp. 589-594.
Hamalainen, M., et al., "Electronic Markets for Learning: Education Brokerages on the Internet," Communications of the ACM, Jun. 1996, vol. 39, No. 6.
PCT International Search Report and Written Opinion, PCT/US2012/051643, Mar. 13, 2013, 9 Pages.
PCT International Search Report and Written Opinion, PCT/US2012/052622, Feb. 19, 2013, 9 Pages.
PCT International Search Report and Written Opinion, PCT/US2013/023683, May 13, 2013, 10 Pages.
Office Action for U.S. Appl. No. 13/182,787, Apr. 5, 2013, 16 Pages.
Office Action for U.S. Appl. No. 13/103,813, May 20, 2013, 19 Pages.
Office Action for U.S. Appl. No. 13/171,130, May 29, 2013, 19 Pages.

(56) References Cited

OTHER PUBLICATIONS

Provisional Patent Application filed for U.S. Appl. No. 61/350,965, filed Jun. 3, 2010, 61 Pages.
Henkel, G., "Take pride in your eBook formatting," Welcome to the world of writer and game designer Guido Henkel, Jan. 3, 2011, 52 pages, can be retrieved at <URL:http://guidohenketcom/2010/12/take-pride-in-your-ebook-formatting/>.
Summons to attend oral proceedings pursuant to Rule 115(1) EPC for European Patent Application No. EP 12749553.9, Feb. 3, 2017, 7 Pages.

* cited by examiner

METHOD, MEDIUM, AND SYSTEM FOR CREATING AN ELECTRONIC BOOK WITH AN UMBRELLA POLICY

CROSS REFERENCE TO RELATED APPLICATIONS

This application claims the benefit of U.S. Provisional Application No. 61/446,239, filed Feb. 24, 2011, which is incorporated by reference in its entirety as if fully set forth herein.

BACKGROUND

1. Technical Field

The invention generally relates to the field of electronic books and, more particularly, to systems and methods for creating and distributing customized books via electronic devices.

2. Background Information

Even as widespread use of the Web reaches its twentieth anniversary, there has been little change in how people make use of textbooks. Students still fill their backpacks with as many of the five-pound books as will fit, and the impact of such paper-based learning is felt not only in students' backs, but in the carbon footprint of all of the infrastructure required to supply, use and dispose of such materials. A change of just a few pages in a textbook may make it obsolete and call for a new version to be printed; students carry not just this week's chapters with them everywhere, but last month's and next month's chapters as well.

Although some attempts have been made to transform study material from Gutenberg's era to the digital era, some of the advantages of using paper books for study purposes have not been replicated. Students from time immemorial have used their texts in different ways. Some highlight portions of particular interest; others place notes in the margins to keep track of clarifications of difficult concepts. Some used textbooks are more useful than new ones because they naturally fall open to the most important pages after repeated use, or because particularly important pages or sections are more dog-eared than others. Electronic reading devices have not to date provided some of these subtle yet important features that help students learn from their texts most efficiently.

Likewise, instructors often would like to teach from textbooks in ways that have not traditionally been available to them. Since the advent of photocopying, professors have sometimes generated course packs for their students by copying portions of textbooks, articles, and other materials into customized booklets. However, this conventional solution presents a variety of problems ranging from copyright clearance to wasteful formats that use more paper than needed (for instance, where an article finishes at the top of a new page). In addition, lack of indexes, tables of contents, and uniform formatting have often made such course packs somewhat difficult for students to use.

It would be advantageous to provide improved mechanisms for students to obtain, read, study from and otherwise use textbook content with some of the tablet, laptop and other electronic devices that are now entering widespread use.

SUMMARY OF THE INVENTION

An electronic book system includes: (i) a publisher subsystem to permit publishers to supply book components in a book components database and book policies in a policies database; (ii) a curator subsystem to allow an instructor to select book components according to the policies for synthesis into an electronic book stored in a book database; and (iii) a distribution subsystem to retrieve the electronic book from the book database, provide it for purchase, collect payment for such purchase, and aggregate payments for disbursement to publishers of the book components.

In one aspect, the policies supplied via the publisher subsystem specify a manner in which the book components may be used individually or in combination, how they are priced, or how they are distributed, and what rights are provided to users. In a related aspect, the policies impose limitations on how the book components may be accessed or ordered.

In another aspect, the curator subsystem provides an interface for specifying a cover, style, arrangement, table of contents, or index for the electronic book.

Further, a method of providing an electronic book includes: (i) storing book components in a book components database; (ii) storing policies corresponding to the book components in a policy database; (iii) selecting a subset of the book components, per the policies, for inclusion in the electronic book; (iv) synthesizing the electronic book as a file; (v) storing the file in a book database; and (vi) distributing the file to customers.

In one aspect of this method, the policies specify a manner in which the book components may be used individually or in combination, how they are priced, or how they are distributed, and what rights are provided to users. In a related aspect, the policies impose limitations on how the book components may be accessed or ordered.

In another aspect of this method, a user interface is provided for specifying a cover, style, arrangement, table of contents, or index for the electronic book.

In still another aspect, the method further includes specifying an umbrella policy for the electronic book based on the policies applicable to the subset.

In yet a further aspect, the method further includes automatically determining a price for the electronic book responsive to prices corresponding to the subset and a pricing model, and in a related aspect, automatically establishing a payment schedule for publishers corresponding to the subset.

Still further, a computer-readable storage medium includes computer instructions to: (i) store book components in a book components database; (ii) store policies corresponding to the book components in a policy database; (iii) select a subset of the book components, according to the policies, for inclusion in the electronic book; (iv) synthesize the book as a file capable of being accessed by a computer-implemented electronic book reader; (v) store the file in a book database; and (vi) distribute the file to customers.

In one aspect of this storage medium, the policies specify a manner in which the book components may be used individually or in combination, how they are priced, or how they are distributed, and what rights are provided to users. In a related aspect, the policies impose limitations on how the book components may be accessed or ordered.

In another aspect, the instructions further provide a user interface for specifying a cover, style, arrangement, table of contents, or index for the electronic book.

In still another aspect, the instructions further include instructions to synthesize an umbrella policy for the electronic book based on the policies applicable to the subset.

In yet a further aspect, the instructions further include instructions to automatically determine a price for the electronic book responsive to prices corresponding to the subset and a pricing model, and in a related aspect, automatically establish a payment schedule for publishers corresponding to the subset.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
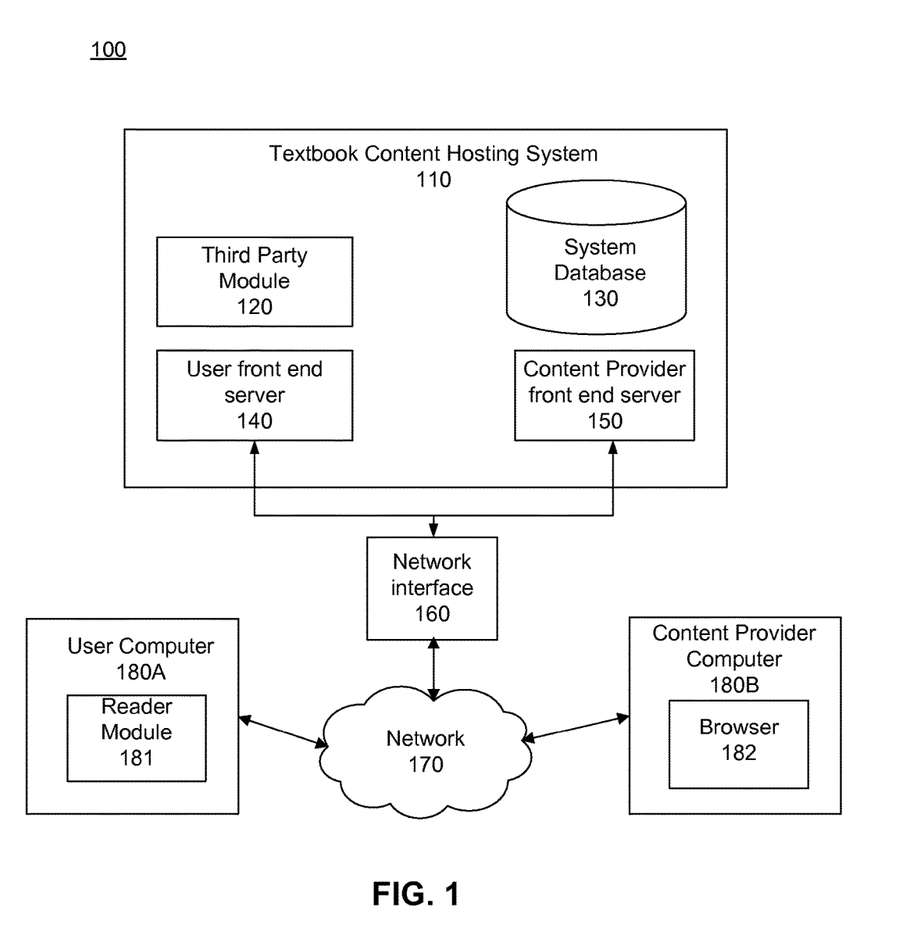
FIG. 1 is a high-level diagram illustrating a networked environment that includes an electronic textbook reader.

FIG. 1 is a high-level diagram illustrating a networked environment 100 that includes a textbook content hosting system 110. The content hosting system 110 makes available for purchase, licensing, rental or subscription textbooks that can be viewed on user and content provider computers 180 (depicted in FIG. 1, for exemplary purposes only, as individual computers 180A and 180B) using a reader module 181 or browser 182. The content hosting system 110 and computers 180 are connected by a network 170 such as a local area network or the Internet.

The network 170 is typically the Internet, but can be any network, including but not limited to any combination of a LAN, a MAN, a WAN, a mobile, a wired or wireless network, a private network, or a virtual private network. The content hosting system 110 is connected to the network 170 through a network interface 160.

As discussed above, only a single user computer 180A is shown, but in practice there are many (e.g., millions of) user computers 180A that can communicate with and use the content hosting system 110. Similarly, only a single content provider computer 180B is shown, but in practice there are many (e.g., thousands or even millions of) content providers 180B that can provide textbooks and related materials for content hosting system 110. In some embodiments, reader module 181 and browser 182 include a content player (e.g., FLASH™ from Adobe Systems, Inc.), or any other player adapted for the content file formats used by the content hosting system 110.

User computer 180A with reader module 181 is used by users to purchase or otherwise obtain, and access, materials provided by the content hosting system 110. Content provider computer 180B is used by content providers to create and provide material for the content hosting system 110. A given computer can be both a client computer 180A and content provider computer 180B, depending on its usage. The hosting service 110 may differentiate between content providers and users in this instance based on which front end server is used to connect to the content hosting system 110, user logon information, or other factors.

The content hosting system 110 comprises a user front end server 140 and a content provider front end server 150 each of which can be implemented as one or more server class computers. The content provider front end server 150 is connected through the network 170 to content provider computer 180B. The content provider front end server 150 provides an interface for content providers to create and manage materials they would like to make available to users. The user front end server 140 is connected through the network 170 to client computer 180A. The user front end server 140 provides an interface for users to access material created by content providers. In one embodiment, the material (e.g., a digital textbook) is downloaded in its entirety to user computer upon purchase; in another embodiment the material is streamed to the user only as needed. Generally speaking, textbooks that are more traditional in nature (e.g., including only words and pictures) may be more efficient to use when downloaded all at once to a user computer, while textbooks that include changing data (e.g., actual climatological data), animations, video, interactive applications and other data-intensive material may more appropriately stream information to the user only as needed.

The content hosting system 110 is implemented by a network of server class computers that can include one or more high-performance CPUs and 1G or more of main memory, as well as 500 GB to 2 Tb of storage. An operating system such as LINUX is typically used. The operations of the content hosting system 110, front end 140 and back end 150 servers as described herein can be controlled through either hardware (e.g., dedicated computing devices or daughter-boards in general purpose computers), or through computer programs installed in computer storage on the servers of the service 110 and executed by the processors of such servers to perform the functions described herein. One of skill in the art of system engineering and, for example, video content hosting will readily determine from the functional and algorithmic descriptions herein the construction and operation of such computer programs.

The content hosting system 110 further comprises a system database 130 that is communicatively coupled to the network 170. The system database 130 stores data related to the content hosting system 110 along with user and system usage information.

The system database 130 can be implemented as any device or combination of devices capable of persistently storing data in computer readable storage media, such as a hard disk drive, RAM, a writable compact disk (CD) or DVD, a solid-state memory device, or other optical/magnetic storage mediums. Other types of computer-readable storage mediums can be used, and it is expected that as new storage mediums are developed in the future, they can be configured in accordance with the descriptions set forth above.

The content hosting system 110 is further comprised of a third party module 120. The third party module 120 is implemented as part of the content hosting system 110 in conjunction with the components listed above. The third party module 120 provides a mechanism by which the system provides an open platform for additional uses relating to electronic textbooks, much as an application programming interface allows third parties access to certain features of a software program. In some embodiments, third party input may be limited to provision of content via content provide computers 180B and content provider third party server 150. Given the wide range of possible operation of system 100, however, in some embodiments it may be desirable to open additional capabilities for third parties who are not providing content to access the system. For example, anonymous use data from groups of students may be made available via third party module 120 to allow tracking of student use of existing textbooks for possible future improvement. As a specific example, aggregated data regarding what sections of a textbook are most often annotated may be helpful to the author of the textbook (or to other authors) to determine where additional explanation of difficult concepts might be warranted.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors included as part of the content hosting system 110. Alternatively, hardware or software modules may be stored elsewhere within the content hosting system 110. The content hosting system 110 includes hardware elements necessary for the operations described here, including one or more processors, high speed memory, hard disk storage and backup, network interfaces and protocols, input devices for data entry, and output devices for display, printing, or other presentations of data.

Numerous variations from the system architecture of the illustrated content hosting system 110 are possible. The components of the system 110 and their respective functionalities can be combined or redistributed. For example, the system database 130, third party module 120, user front end server 140, and content provider front end server 150 can be distributed among any number of storage devices. The following sections describe in greater detail the reader module 181, system database 130, and the other components illustrated in FIG. 1 in greater detail, and explain their operation in the context of the content hosting system 110.

Figure 2:
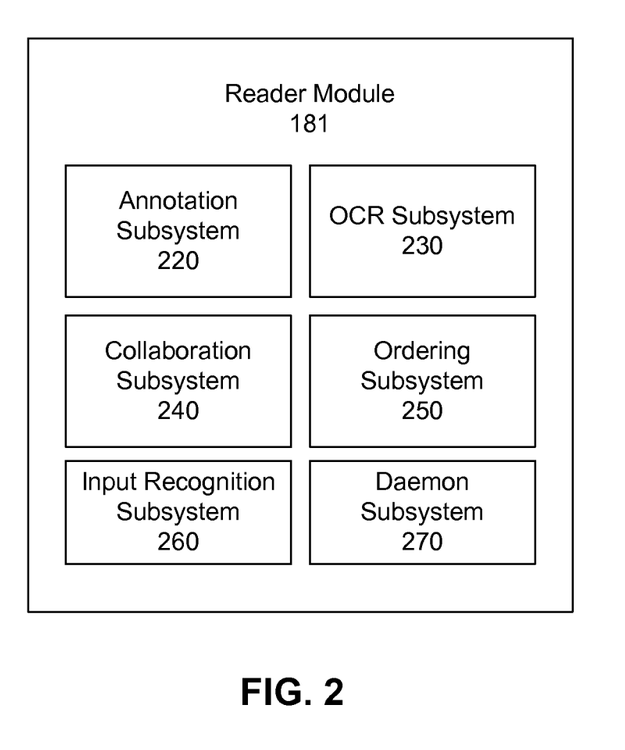
FIG. 2 illustrates a logical view of a reader module used as part of an electronic textbook reader.

FIG. 2 illustrates a functional view of a reader module 181 used as part of a electronic textbook system. In the embodiment described above in connection with FIG. 1, the reader module is implemented on user computer 180A, but it should be recognized that in other embodiments, portions discussed herein could also be implemented on other computers (e.g., those in content hosting system 110) that are in communication with reader module 181.

Reader module 181 is configured to address the fact that students use textbooks differently than other readers use typical books. Students typically study from, rather than merely read, textbooks. Studying is typically less linear than other reading, as texts are rarely read in "start-to-finish" manner. Studying is often much more interactive than typical reading, with annotations, cross-referencing between problem sets and main portions, reference to glossary or definitions sections, and the like. Studying is also inherently social and collaborative as well—far more so than most other types of reading. Learning in general, and studying in particular, typically combines attention to textbooks with creation and reference to notebooks, problem sets, lab experiment results, lecture materials, and other related sources.

Reader module 181 includes various subsystems to facilitate the specialized uses students make of textbooks. In the embodiment illustrated in FIG. 2, reader module 181 includes an annotation subsystem 220, an OCR subsystem 230, a collaboration subsystem 240, an ordering subsystem 250, an input recognition subsystem 260, and a daemon subsystem 270. Many of these subsystems interact with one another, as described below.

Annotation subsystem 220 provides various user tools and interfaces to allow students to mark up portions of an electronic textbook as they may find most helpful for learning and studying purposes. Annotation subsystem 220 includes conventional features such as highlighting and text entry tools, and also includes more advanced tools. For example, as described below annotation subsystem 220 keeps track of textbook portions for which a student has provided annotations, and collects those portions into a personalized study guide based on a user command.

OCR subsystem 230 is a recognition subsystem that takes information not originally in machine-readable form and converts it to machine readable form. For example, OCR subsystem 230 communicates with annotation subsystem 220 to convert handwritten student notes (entered graphically via finger or stylus gestures on a touch screen, for instance) into machine readable text. As used here, OCR subsystem includes not only optical character recognition, but other types of recognition as well, for instance: voice-to-text recognition to allow a student to speak rather than write annotations; image to text recognition for photographs the student may take of a professor's notes on a blackboard during a lecture; and other types of recognition as well that may be provided within an electronic textbook or as a third party add-on. As a specific example, one type of recognition that may be helpful in a music theory class is recognition of a sound (a melody) and translation into a visual score (sheet music) for that melody.

Collaboration subsystem 240 provides various user functions that allow students to work together. As detailed below, for example, users can share their annotations and notes with their study group, their entire class, or other users worldwide of their electronic textbook. Further, collaboration subsystem 240 includes social network facilities to permit students to undertake study sessions with audio and visual chat, to ask and answer questions, and to submit questions to professors or teaching assistants.

Ordering subsystem 250 represents tools that allow students to obtain electronic textbooks and related materials. In one embodiment, ordering subsystem 250 is implemented as an electronic marketplace (e.g., the DROID™ marketplace implemented on the ANDROID™ operating system for smart phones and tablet computers). Third parties offer electronic textbooks and related materials such as study guides, problem sets, updates, workbooks, and the like. Some of these materials are available for purchase; others are free. In some embodiments, provision via other mechanisms (e.g., subscription, barter, "pay-per-view") is supported, as may be desired by any subset of a student community or content provider group.

Input recognition subsystem 260 provides user interface tools to facilitate use of electronic textbooks and related features. For instance, by sensing particular gestures on a touch screen of user computer 180A, the system temporarily shifts display of a textbook from a current page to a new section, while keeping track of the section of primary interest. Thus, a student working on a problem set section of the textbook can quickly look back at the text of the chapter, or a student reading a section for the first time can quickly jump to a glossary section of the textbook for a definition of an unfamiliar term or concept.

Reader module 181 is configured to permit user-selected applications to run to enhance a student's ability to work with an electronic textbook. For example, a student may purchase an application that provides study questions on a per-chapter basis for textbooks that do not include such questions. In addition, reader module 181 includes a daemon subsystem 270 to provide additional add-on features without the user launching a visible application for such features. As one example, a music student may have one or more daemons that allow recognition of images of sheet music and audio playback of the corresponding music, or that recognize particular melodies that may be captured by a microphone associated with user computer 180A, or that synthesize musical compositions based on a student's input.

Figure 3:
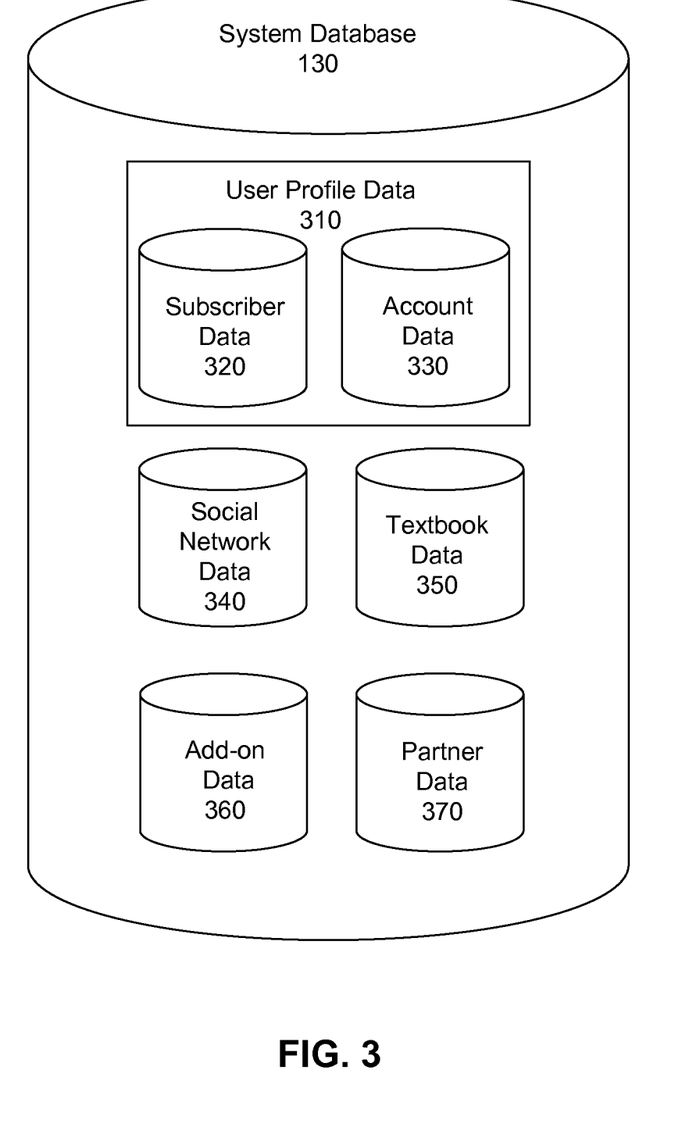
FIG. 3 illustrates a logical view of a system database that stores data related to the content hosting system.

FIG. 3 illustrates a functional view of the system database 130 that stores data related to the textbook content hosting system 110. The system database 130 may be divided based on the different types of data stored within. This data may reside in separate physical devices, or it may be collected within a single physical device.

With respect to content providers, partner data 370 comprises information regarding content providers, or partners, registered with the content hosting system 110 that have permission to create and deliver content. Partner data 370 includes provider contact information.

For providers creating paid textbooks or other content, partner data 370 contains billing and revenue sharing information for the provider. Some providers may create subscription channels while others may provide single payment or free delivery of electronic textbooks and related information. These providers may have specific agreements with the operator of the content hosting system 110 for how revenue will flow from the content hosting system 110 to the provider. These specific agreements are contained in the partner data 370.

Alternatively, some providers may not have specific agreements with the operator of the content hosting system 110 for how revenue will flow from the content hosting service 110 to the provider. For these providers, partner data 370 comprises a standardized set of information dictating how revenue will flow from the content hosting system 110 to the providers. For example, for a given partner, the partner data may indicate that the content hosting system 110 receives 25% of the revenue for an item provided to a user, and the content provider receives 75%. Of course other more complex allocations can be used with variable factors based on features, user base, and the like.

User profile data storage 310 includes information about an individual user (e.g., a student), to facilitate the payment and collaborative aspects of system 100. Subscriber data storage 320 includes identifying information about the student, such as the electronic textbooks the student has obtained and the social network groups the user has joined. In some embodiments, subscriber data storage 320 also maintains information regarding where the student is in each of the student's textbooks to allow, for example, a student to read part of a textbook chapter on a smart phone while on a campus bus and continue reading from the same spot on the student's desktop computer in a dorm room. Subscriber data storage 320 contains, in some embodiments, data about the user that is not explicitly entered by the user, but which is tracked as the user navigates through textbooks and related materials. Subscriber viewing data includes, for example, user study habits, such as the total time spent by the subscriber per chapter, average time spent per week in a textbook, proportion of time spent on initial reading as opposed to problem-set activity and pre-test review, and the like. Such information is in some embodiments made available to the student to assist in tracking and improving study habits; in other embodiments aggregated information is used to help determine how best to improve textbooks and related materials.

Account data storage 330 keeps track of the user's payment mechanisms (e.g., Google Inc.'s CHECKOUT®) related to the user's ability to obtain content from system 100.

Social network data storage 340 maintains the information needed to implement a social network engine to provide the collaborative features discussed herein, e.g., social graphs, social network preferences and rules.

Textbook data 350 stores the actual content that is provided to users upon their request, such as electronic textbook files.

Add-on data storage 360 maintains information for related features, such as non-static data relating to textbooks (e.g., climatological data that could be used by students in connection with an environmental studies textbook).

In one embodiment, conventional mechanisms are used to implement many of the aspects of system database 130. For example, the existing mechanisms from Google Inc.'s BOOKS™ GMAIL™, BUZZ™ CHAT™, TALK™, ORKUT™, CHECKOUT™, YOUTUBE™, SCHOLAR™, BLOGS™ and other products include aspects that can help to implement one or more of storage facilities 310-370 and modules 220-270. Google Inc. already provides eBook readers for ANDROID™ devices (phones, tablets, etc.), iOS devices (iPhones®, iPads®) and other devices from Apple, Inc.) and various desktop Web browsers, and in one embodiment Google Inc.'s EDITIONS™ eBook reader application is modified to provide the functionality described herein.

As mentioned above, user profile data 310 is usable on a per-student basis and is also capable of being aggregated for various populations of subscribers. The population can be the entire subscriber population, or any selected subset thereof, such as targeted subscribers based on any combination of demographic or behavioral characteristics, or content selections. System-wide usage data includes trends and patterns in usage habits for any desired population. For example, correlations can be made between electronic textbooks and add-ons that students choose (presumably related in some way to those textbooks). In one embodiment, when a user obtains a new textbook, such data are used to recommend other related items the user might also be interested in obtaining Valuation of items, relative rankings of items, and other synthesized information can also be obtained from such data.

A content provider interface is used by a content provider to create and manage electronic textbooks on the content hosting system 110. The content provider interface is transmitted to the content provider through the content provider front end server 150 and browser 182.

The content provider interface contains an overview interface (not shown) for providers to view when they log into the content hosting system 110 through the content provider front end server 150. The overview interface contains options for creating new materials, modifying existing materials, responding to user questions/suggestions, viewing system usage data, and viewing related data (e.g., which third party add-ons tend to be obtained by those who have gotten the electronic textbook). The overview interface further contains brief summaries of information about how the electronic textbook is being received in the student population, as well as among professors and teaching assistants. Providers may customize which summaries are displayed.

An upload interface (not shown) allows a provider to upload material to be offered in the system. The upload interface allows the user to configure options regarding the details of the uploaded material including an indication of whether the video is free or what its cost is, and whether there are any restrictions on the nature of use of the work (e.g., free if used for distance learning, paid otherwise). The upload interface allows the configuration and upload of multiple items at the same time. The upload interface can upload items individually, or in bulk.

In recent years, professors have begun offering more and more interdisciplinary courses. Unfortunately, for many students this has required purchase of multiple textbooks in disparate areas, even though only one small portion might be used from some of those books.

Content provider front end server 150 is configured to permit a content provider to order only a portion of an electronic textbook. In one embodiment, content provider front end server 150 is hosted along with the other components of textbook hosting content system 110; in another embodiment some portion of the functionality of content provider front end server 150 is hosted on servers operated by various publishers, accessible via a web site or client application, to make works available to instructors, students, and automated systems such as textbook content hosting system 110.

In one embodiment, content provider front end server 150 specifies which titles must be purchased as an entire unit and which are provided in an "unbundled manner" such that instructors (and in some cases students directly) can choose select components only, such as individual chapters. Likewise, content provider front end server also specifies other information pertinent to use of components: a pricing model (buy-sell model with suggested retail price and fixed revenue share percentage with discounting possible or agency model with negotiated revenue share in which publisher is the seller and retailer collects taxes on behalf of the publisher); a revenue model (purchase, in which the user owns the title; perpetual license; rental; or subscription); pricing parameters (wholesale/retail prices, monthly fees/license/subscription rates). In one embodiment, allowable or prohibited combinations are also specified, such as a publisher may specify that any selection of chapter 7 requires chapters 9-14 as well, or a publisher may specify that components may be used except in combination with a rival publisher's textbook. More complicated combinations are supported as well, such as requiring that a certain chapter appear before another chapter in a custom-designed coursebook, for instance as may be detailed in a directed acyclic graph of dependencies. In certain environments where other specifications are appropriate, they are also supported, e.g., limitations on number of concurrent users (in one particular embodiment separating online from offline users with separate limits for each); permissible geographic limitations for purchase or use; and limitations on whether the title may be purchased, rented, subscribed or loaned.

Content provider computer 180B is configured to allow an instructor to select less than a complete textbook, and to combine various textbooks and other sources together (e.g., case studies, web pages, journals, magazines). All such sources of whatever sort are referred to herein as book "components." Using content provider computer 180B, the instructor selects, orders and arranges the components as desired to match with a syllabus, provides a title and any other desired information for this material, and then textbook content hosting system 110 generates a new, instructor-curated digital textbook based on the instructor's input. The instructor is also provided an interface for specifying text and layout of a cover page, including book title, instructor, academic institution, quarter or semester, year, course and section.

The instructor is provided with a number of search, browse, automatic recommendation and prompt tools to add and organize content. Searching and browsing are made available based on book title, chapter title, keyword, author, genre or other appropriate factors. Browser 182 is configured to indicate to the instructor which choices are valid and which are not based on publisher rules and system settings. The instructor can specify not only textbook portions, but academic journal articles, web pages or dynamic web applications and other material for inclusion in the course book. The instructor also specifies the order of these components and whether to add a table of contents, as well as whether to add an index. If a table of contents or index are desired, they are automatically created. The instructor can further specify whether the coursebook is to be published in color or black & white (where the source material permits). The instructor also specifies whether to serially number all of the pages in the new coursebook (replacing any original page numbering of the components) or merely rely on any internal numbering of the components.

The instructor is also provided an option to normalize style elements across all components, i.e., reformat components as much as possible to produce a cohesive book with unified styling. For example, typeface, font size, margins are made consistent, in one embodiment by choosing a predominant style found in the majority of components. In some instances, where source materials are primarily in flexible formatting (e.g., XML), an instructor-specified style (or in the absence of one, a default style) is applied to the components.

The new book is then synthesized by reformatting the components, reordering the components, adding any specified table of contents or index, concatenating the components into a single work, adding a cover sheet, creating a digital file suitable for use via reader module 181 (for example PDF or EPUB), and arranging for issue of a new ISBM to identify the work.

In addition, synthesis of the book also includes reconciling all restrictions, limitations and requirements of the components and synthesizing therefrom an umbrella policy covering the book. For example, if only one of three chapters in a book is subject to a geographic limitation (e.g., licensed for use in California only), then the entire book is made subject to that limitation. In one embodiment, such policy information is stored in a policy database (not shown).

In one embodiment, a rights management subsystem (not shown) of textbook content hosting system 110 clears the needed legal rights for the selected sources, generates an aggregate price for the textbook based on the component prices, and offers the textbook in same manner as a complete publisher-sourced electronic textbook (as described above).

When a student purchases such a textbook using ordering subsystem 250 of reader module 181, textbook content hosting system 110 collects the payment, calculates the royalty due to each publisher or other rights holder, and makes the corresponding payments.

Textbook content hosting system 110 publishes a new textbook by, in addition to determining prices/conditions as specified above, making digital versions available in electronic eTextbook stores, such as may be provided by Google Inc.'s EBOOKSTORE™ or at AMAZON.COM®. In one embodiment, a separate instructor-curated textbook database (not shown) is used to store such newly authored textbooks. In another embodiment, hardcopies of the book are printed and made available at one or more traditional bookstores, such as a campus bookstore or national retailer.

As previously mentioned, one of the benefits of using electronic textbooks is that various types of usage data, such as which sections are most frequently annotated, can be aggregated and used to improve future editions of a textbook. In addition, aggregated data are used in some embodiments to determine compensation for a publisher's sales force, so that sales personnel responsible for schools or geographies with strong sales and usage are rewarded for successfully promoting the book.

Figure 4:
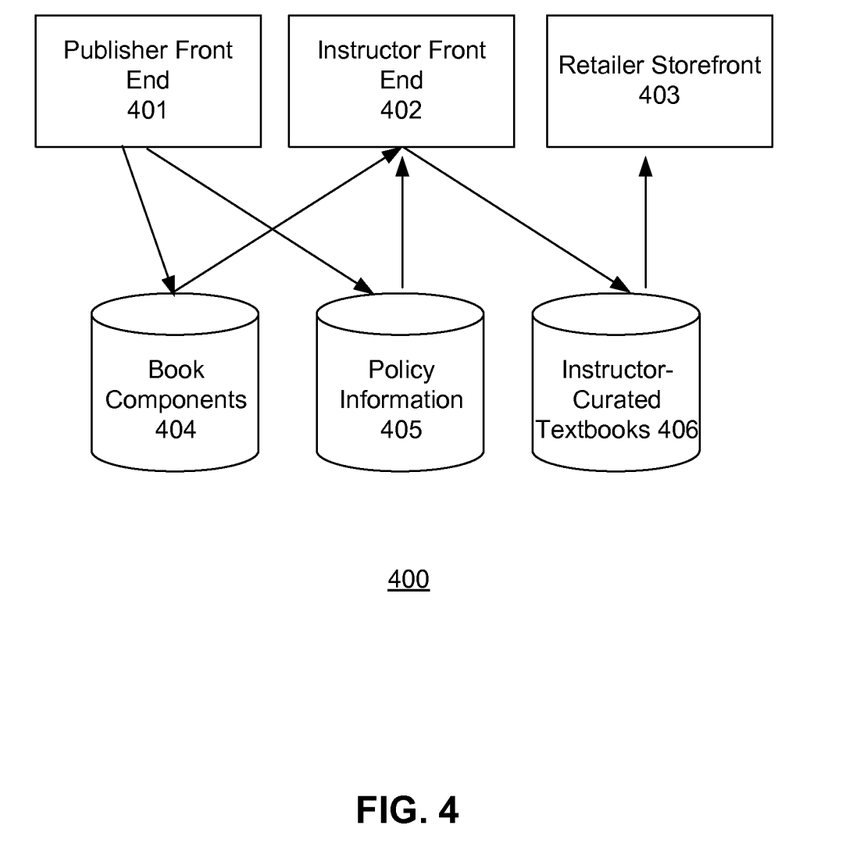
FIG. 4 is a high level diagram of a system providing creation and distribution of instructor-curated electronic textbooks.

For purposes of discussion, those of the various components described above that are pertinent to creation and distribution of customized textbooks are characterized in an embodiment illustrated in FIG. 4 as system 400. System 400 includes a publisher front end 401, an instructor front end 402, a retailer storefront 403, a book components database 404, a policy information database 405, and an instructor-curated textbooks database 406. In some embodiments, front ends 401, 402 and storefront 403 are implemented using websites; in other embodiments they are implemented using software applications, websites or combinations thereof.

Publisher front end 401 provides a facility by which publishers can upload book content and set allowable parameters for its use as described above. For example, a user interface allows a publisher to specify which titles are "unbundled", which pricing models are applicable to each work (e.g., buy-sell or agency), which revenue models are applicable (e.g., provision of a copy by ownership or license, rental, subscription), what pricing parameters will be used, what combinations of components are permitted and in what order, and constraints on usage of material (e.g., number of users permitted, geographic territories in which the title may be purchased or consumed). The book content specified by publisher front end 401 is stored in book components database 404, and the parameters and other related information are stored in policy information database 405.

Instructor front end 402 provides a facility by which professors, for example, can create custom books by including components from various sources. For example, a user interface allows browsing and selecting components based on author, title (book or chapter), keyword, or genre. In addition, recommendations are provided for user selection. In some embodiments the recommendations are based on the user's prior history in selecting titles; in others they are based on subject matter, level (e.g., introductory v. advanced), publisher, geography (e.g., U.S. v. Canadian usage) or combinations of such factors. Not only electronic books, but other content such as web pages or dynamic web applications can also be selected for inclusion. In addition to selecting components, instructor front end 402 prompts the user to specify text and layout for a cover page (e.g., book title, instructor, academic institution, quarter/semester, year, course name/number, section name/number). Further, front end 402 prompts the user to specify an order for the components, a table of contents, an index, pagination, formatting (e.g., uniform typeface and other normalized parameters, color or b/w presentation). It is anticipated that a great deal of available works will be made available in a manner in which content and formatting instructions are independent (e.g., XML), so that a cohesive book with unified styling can be created even from very disparate components. In one embodiment, if flexible formatting is not permitted, for instance due to publisher requirements in the policy information database, front end 402 suggests use of a typeface for other components (e.g., cover page, table of contents) in a corresponding form (typeface, font size, margins and the like) to provide an aesthetically pleasing end product.

Thus, instructor front end 402 calls upon information from both book components database 404 and policy information database 405 for a proposed new textbook. Should there be any incompatibilities between what is requested and what is available or permitted, front end 402 provides suggested solutions (e.g., text on similar subject from alternative publisher, addition of required chapter).

Once all requirements are met, system 400 creates the new book by reformatting and reordering the various components, adding any specified table of contents, index and pagination, concatenating all of the components into a single work, adding any specified cover sheet, and creating a digital file representation of the new book, for instance in PDF or EPUB format. In addition, system 400 is configured in some embodiments to facilitate issuance of a new ISBN for the new work.

Aside from the production, system 400 further reconciles all of the policy information relating to the selected components and synthesizes therefrom a new umbrella policy that will cover the work. In one embodiment, the new policy is synthesized to be no less restrictive than the policies associated with any particular component. Thus, if only one of a number of chapters in a book has a geographical limitation (e.g., use in California only), the book will have the same geographical limitation.

Once the book is synthesized, system 400 provides processing to support the publication of the book, including computing a price for the book. This is done in one embodiment by computing the retail price of each component, applying any rules for combination as may apply to that component, summing the component prices, and adding any applicable service fee or margin.

System 400 publishes the book by placing the work in the instructor-curated textbooks database 406, and populating information about the book in retailer storefront 403. In one embodiment, retailer storefront is an electronic book store, such as those provided by Amazon.com and Google, permitting a user to instantly download the book from storefront 403. In another embodiment, storefront 403 also includes facilities for providing the book through traditional physical bookstores, such as those operated by Barnes & Noble or traditional campus bookstores, in which case the books are printed and bound for purchasers.

Storefront 403 provides a mechanism for obtaining payment from the retailers, which system 400 reconciles for payment to contributing publishers. Specifically, payment is collected, payments due to each publisher are aggregated (in one embodiment for all electronic textbooks sold, rather on a per-title basis), and the aggregate payment is disbursed to the publisher on a regular basis (e.g., monthly), along with an accounting of the number of each component sold. In one embodiment, statistics such as number of each component sold by day, by venue is also provided.

As noted above, while the discussion here has been focused on a tablet computer (likely with stylus support to assist with handwritten note-taking), electronic textbook readers may likewise be implemented on other devices, such as laptop computers with touch screen support, smartphones, dedicated book reader devices, desktop computers and the like.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs executed by a processor, equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing electronic textbooks using a content hosting system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An electronic book system, comprising:
a memory storing computer executable instructions for:
a publisher processing subsystem configured to permit publisher supply of book components and policies corresponding to the book components, the book components being stored in a book components database, the policies being stored in a policy database;
a curator processing subsystem configured to permit curator selection of a plurality of the book components from the book components database, responsive to the policies, for synthesis into an electronic book, the synthesis including determining an umbrella policy, based on a plurality of the policies applicable to the plurality of the components, specifying a manner in which the electronic book may be used, the curator processing subsystem further configured to store the electronic book in association with the umbrella policy in a book database; and
a distribution subsystem configured to retrieve the electronic book and the umbrella policy from the book database and supply the electronic book to a reader subject to the umbrella policy; and
one or more processors coupled to the memory for executing the computer executable instructions.

2. The electronic book system of claim 1, wherein at least one of the policies specifies a manner in which the book components may be used individually and in combination.

3. The electronic book system of claim 1, wherein at least one of the policies specifies a manner in which the book components are priced.

4. The electronic book system of claim 1, wherein at least one of the policies specifies a manner in which the book components are distributed.

5. The electronic book system of claim 1, wherein at least one of the policies specifies a manner in which rights to the book components are provided to users.

6. The electronic book system of claim 1, wherein at least one of the policies specifies a limitation on how the book components may be accessed.

7. The electronic book system of claim 1, wherein at least one of the policies specifies a limitation on how the book components may be ordered.

8. The electronic book system of claim 1, wherein the curator processing subsystem is further configured to provide an interface for specifying a cover page for the electronic book.

9. The electronic book system of claim 1, wherein the curator processing subsystem is further configured to provide an interface for specifying a style for the electronic book, the style being applied to the plurality of the book components during synthesis to reformat the plurality of the components.

10. The electronic book system of claim 1, wherein the curator processing subsystem is further configured to provide an interface for arranging the plurality of the components for presentation in the electronic book.

11. The electronic book system of claim 1, wherein the curator processing subsystem is further configured to provide an interface for specifying a table of contents for the electronic book.

12. The electronic book system of claim 1, wherein the curator processing subsystem is further configured to provide an interface for specifying an index for the electronic book.

13. A computer-implemented method of providing an electronic book, comprising:
- storing book components in a book components database;
- storing policies corresponding to the book components in a policy database;
- selecting a plurality of the book components, responsive to the policies, for inclusion in the electronic book;
- synthesizing, by a processor, the electronic book as a file capable of being accessed by a computer-implemented electronic book reader;
- determining an umbrella policy, based on a plurality of the policies applicable to the plurality of the components, specifying a manner in which the electronic book may be used;
- storing the file in association with the umbrella policy in a book database; and
- distributing the file to readers subject to the umbrella policy.

14. The method of claim 13, wherein at least one of the policies specifies a manner in which the book components may be used individually and in combination.

15. The method of claim 13, wherein at least one of the policies specifies a manner in which the book components are priced.

16. The method of claim 13, wherein at least one of the policies specifies a manner in which the book components are distributed.

17. The method of claim 13, wherein at least one of the policies specifies a manner in which rights to the book components are provided to users.

18. The method of claim 13, wherein at least one of the policies specifies a limitation on how the book components may be accessed.

19. The method of claim 13, wherein at least one of the policies specifies a limitation on how the book components may be ordered.

20. The method of claim 13, further comprising providing an interface for specifying a cover page for the electronic book.

21. The method of claim 13, further comprising;
- providing an interface for specifying a style for the electronic book; and
- applying the style to the plurality of the components to reformat the plurality of the components.

22. The method of claim 13, further comprising providing an interface for arranging the plurality of the components for presentation in the electronic book.

23. The method of claim 13, further comprising providing an interface for specifying a table of contents for the electronic book.

24. The method of claim 13, further comprising providing an interface for specifying an index for the electronic book.

25. A non-transitory computer-readable storage medium containing executable computer program instructions for providing an electronic book, the computer program instructions comprising:
- instructions to store book components in a book components database;
- instructions to store policies corresponding to the book components in a policy database;
- instructions to select a plurality of the book components, responsive to the policies, for inclusion in the electronic book;
- instructions to synthesize the book as a file capable of being accessed by a computer-implemented electronic book reader;
- instructions to determine an umbrella policy, based on a plurality of the policies applicable to the plurality of the components, specifying a manner in which the electronic book may be used;
- instructions to store the file in association with the umbrella policy in a book database; and
- instructions to distribute the file to readers subject to the umbrella policy.

26. The non-transitory computer-readable storage medium of claim 25, wherein at least one of the policies specifies a manner in which the book components may be used individually and in combination.

27. The non-transitory computer-readable storage medium of claim 25, wherein at least one of the policies specifies a manner in which the book components are priced.

28. The non-transitory computer-readable storage medium of claim 25, wherein at least one of the policies specifies a manner in which the book components are distributed.

29. The non-transitory computer-readable storage medium of claim 25, wherein at least one of the policies specifies a manner in which rights to the book components are provided to users.

30. The non-transitory computer-readable storage medium of claim 25, wherein at least one of the policies specifies a limitation on how the book components may be accessed.

31. The non-transitory computer-readable storage medium of claim 25, wherein at least one of the policies specifies a limitation on how the book components may be ordered.

32. The non-transitory computer-readable storage medium of claim 25, wherein the instructions further comprise instructions to provide an interface for specifying a cover page for the electronic book.

33. The non-transitory computer-readable storage medium of claim 25, wherein the instructions further comprise:
- instructions to provide an interface for specifying a style for the electronic book; and
- instructions to apply the style to the plurality of the components to reformat the plurality of the components.

34. The non-transitory computer-readable storage medium of claim 25, wherein the instructions further comprise instructions to provide an interface for arranging the plurality of the components for presentation in the electronic book.

35. The non-transitory computer-readable storage medium of claim 25, wherein the instructions further comprise instructions to provide an interface for specifying a table of contents for the electronic book.

36. The non-transitory computer-readable storage medium of claim 25, wherein the instructions further comprise instructions to provide an interface for specifying an index for the electronic book.

* * * * *